T. MAURER.
POWER TRANSMISSION.
APPLICATION FILED OCT. 19, 1917.
1,304,081.
Patented May 20, 1919.
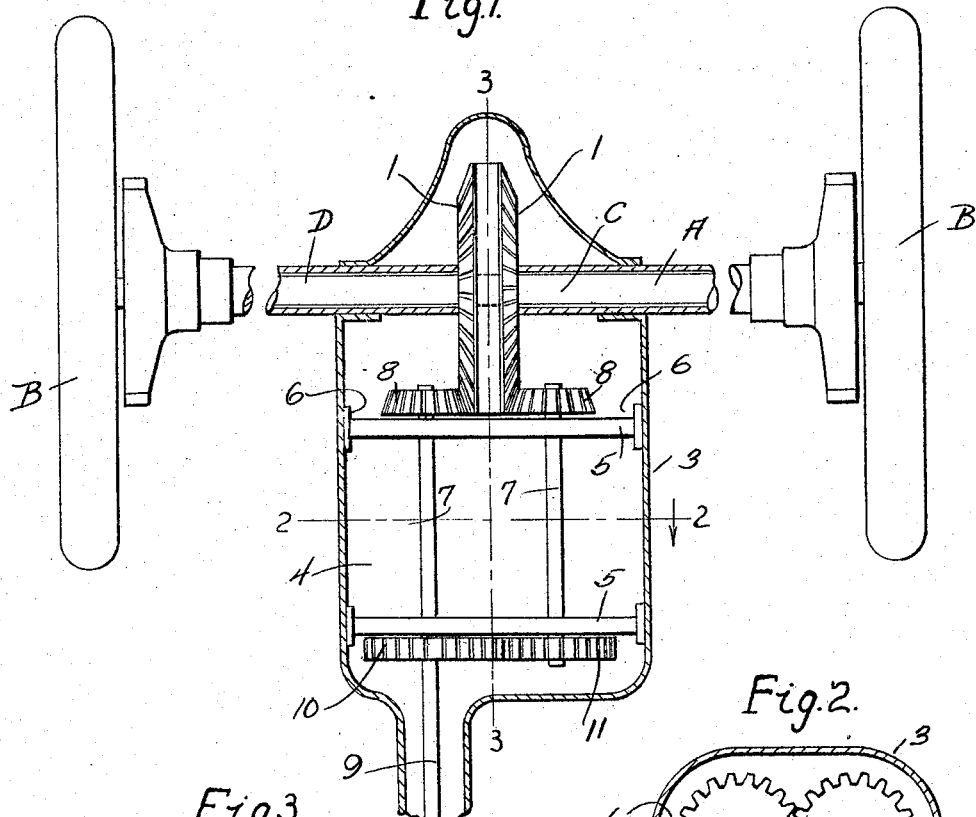
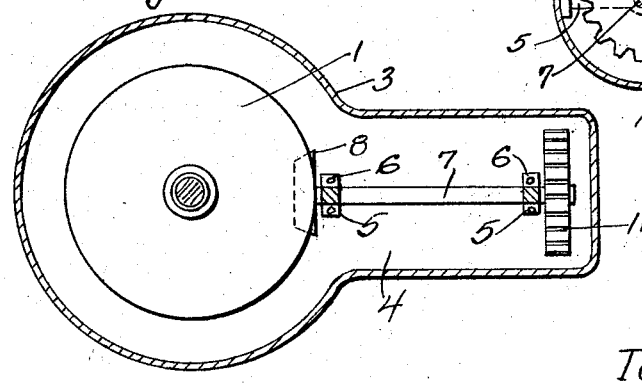
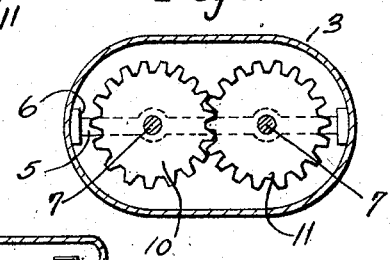
WITNESSES
Alfred Hazel.
INVENTOR
Tony Maurer
ATTORNEY

UNITED STATES PATENT OFFICE.

TONY MAURER, OF EDEN, MONTANA.

POWER TRANSMISSION.

1,304,081.  Specification of Letters Patent.  Patented May 20, 1919.

Application filed October 19, 1917. Serial No. 197,481.

*To all whom it may concern:*

Be it known that I, TONY MAURER, a citizen of the United States, residing at Eden, in the county of Cascade and State of Montana, have invented certain new and useful Improvements in Power Transmission, of which the following is a specification.

This invention relates to automobile transmission and more particularly to an improved power transmission whereby power may be imparted to the driving axle of the wheel without any loss of power and with a material decrease in the torsional strain now generally assumed by the large beveled gears generally mounted on the driving axle.

One of the objects of the invention is to provide a mechanism that may be mounted in connection with the driving gears and rear axle of an automobile whereby power may be imparted to the axle through the driving shaft and a counter shaft associated therewith.

A further object of this invention is the provision of a power transmission which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a horizontal section taken through the device showing it connected to the rear axle of an automobile.

Fig. 2 is a section on the line 2—2 of Fig. 1.

Fig. 3 is a section on the line 3—3 of Fig. 1.

Referring to the drawing wherein is illustrated the preferred form of my invention, in which like numerals of reference indicate corresponding parts throughout the several views, the rear axle A is supported by the usual rear wheels B and the axle is divided in the usual manner to consist of the two axle sections C. and D. The ends of these two sections are disposed in close proximity and each has a bevel gear 1 to receive the power whereby the axle is driven. A gear casing 3 is designed to embrace these gears and project forwardly from the axle for forming a gear housing 4. Two transverse bearing arms 5 are mounted in the gear housing and supported by the side walls thereof through the medium of flanges 6 bolted to the housing. These transverse supporting arms receive supporting shafts 7 disposed in parallelism and arranged in a horizontal plane as shown to advantage in Fig. 2 of the drawing.

The rear ends of these shafts 7 are provided with beveled pinions 8 which are in mesh with the bevel gears 1 as shown to advantage in Fig. 1 of the drawing. One shaft 7 is a continuation of the driving shaft 9 which will be attached to the motor in the usual manner for receiving power. Mounted on the shaft 9 and within the housing 4 is a gear 10 in mesh with a second similar gear 11 on the forward end of the other shaft 7. In this manner power is transmitted from the shaft 9 to the other shaft 7 which acts as a counter shaft and rotates at the same speed as the extended portion of the shaft 9. When the device is in operation, the shaft 9 will impart movement through the gears to the beveled gears 1 which will be both rotated at the same speed and it will be obvious that any torsional strain on the bearing for the rear axle will be diminished by virtue of the fact that the faces of the beveled gears 1 are opposed and are engaged by the pinions 8 from opposite sides.

From the foregoing it will be observed that a very simple and durable gearing has been provided the details of which embody the preferred form. I desire it to be understood, however, that slight changes in the minor details of construction may be made without departing from the spirit of the invention or the scope of the claim hereunto appended.

Claim.

A gearing device of the character described comprising in combination with a rear axle centrally divided into two axle sections, having their ends in close proximity and adapted to operate independently of each other, a beveled gear mounted on each axle section, the two beveled gears having their faces opposed, a housing encompassing the beveled gears and provided with interior brackets forming shaft bearings, a pair of shafts, one being relatively short and disposed entirely within the said housing, a driving shaft formed of a continuation of one of the said pair of shafts, beveled pinions mounted on the inner ends of the said pair of shafts, and in mesh with the said beveled gears, and gears mounted entirely within the housing on the said pair of shafts and in mesh with each other to impart movement to the shorter of the said pair of shafts when the driving shaft is actuated, whereby either of the said axle sections may be driven independently of the other.

In testimony whereof I affix my signature in presence of two witnesses.

TONY MAURER.

Witnesses:
   CHRIST E. MAURER,
   FRANK YOUNG.

Copies of this patent may be obtained for five cents each, by addressing the "Commissioner of Patents, Washington, D. C."